United States Patent
Hiei et al.

(10) Patent No.: US 8,381,610 B2
(45) Date of Patent: Feb. 26, 2013

(54) ACCELERATOR DEVICE

(75) Inventors: Masaki Hiei, Odawara (JP); Keigo Suzuki, Odawara (JP)

(73) Assignee: Mikuni Corporation, Tokyo (JP)

( * ) Notice: Subject to any disclaimer, the term of this patent is extended or adjusted under 35 U.S.C. 154(b) by 0 days.

(21) Appl. No.: 13/209,601

(22) Filed: Aug. 15, 2011

(65) Prior Publication Data

US 2011/0314955 A1 Dec. 29, 2011

Related U.S. Application Data

(63) Continuation of application No. PCT/JP2010/000942, filed on Feb. 16, 2010.

(30) Foreign Application Priority Data

Feb. 16, 2009 (JP) ................................. 2009-032900
Feb. 26, 2009 (JP) ................................. 2009-044158

(51) Int. Cl.
*B62K 23/04* (2006.01)
(52) U.S. Cl. ............................ 74/491; 74/507; 74/551.9
(58) Field of Classification Search .................. 74/488, 74/491, 507, 551.9
See application file for complete search history.

(56) References Cited

U.S. PATENT DOCUMENTS

2004/0216550 A1 * 11/2004 Fallak et al. ................. 74/551.9
2010/0332059 A1 * 12/2010 Lee et al. ......................... 701/22

FOREIGN PATENT DOCUMENTS

| JP | 6-344968 | * 12/1994 |
| JP | 11-201713 | * 7/1999 |
| JP | 2002-264876 | 9/2002 |
| JP | 2005-41259 | 2/2005 |
| JP | 2008-162420 | 7/2008 |
| JP | 2009-13834 | 1/2009 |

OTHER PUBLICATIONS

International Search Report for PCT/JP2010/000942, mailed May 25, 2010.

* cited by examiner

*Primary Examiner* — William C Joyce

(57) ABSTRACT

An accelerator device for performing an acceleration operation includes a rotary body which rotates with rotation of a grip, a magnet which rotates with rotation of the rotary body, a rotation angle detector which detects a rotation angle of the magnet, an urging member which returns the grip to an original point position by urging the rotary body, and a separation member which separates the rotary body and the rotation angle detector, the rotation angle detector is fixed to the separation member and the rotary body is rotatably held thereby while the urging member urges the rotary body toward the separation member as well as in the rotation direction, so that positional variation of the rotation angle detector against the magnet can be prevented.

4 Claims, 6 Drawing Sheets

ACCELERATOR DEVICE

CROSS-REFERENCE TO RELATED APPLICATIONS

This application is a continuation, filed under 35 U.S.C. §111(a), of PCT international application No. PCT/JP2010/000942, filed Feb. 16, 2010, which application claims the priority benefit of Japanese patent application Nos. 2009-032900, filed Feb. 16, 2009, and 2009-044158, filed Feb. 26, 2009, in the Japanese Patent Office, the disclosures of which are incorporated herein by reference.

BACKGROUND

1. Field

The present disclosure relates to an accelerator device to output a signal based on a rotation angle of a grip which is disposed at a handlebar being repeatedly-rotatable from a predetermined original point position about an axis center of the handlebar.

2. Description of the Related Art

In a vehicle having handlebars as an operating device for a motorcycle etc. and having a drive device such as an engine, a grip for performing acceleration operation is disposed to a handlebar section.

In the related art, a grip which is approximately cylinder-shaped is rotatably placed at an end part of a handlebar in a state of being externally fitted to the end part. Using the grip, it is possible to vary opening of a throttle valve with a rotation amount (i.e., a rotation angle) of the grip.

Traditionally, a grip and a throttle valve have been interlocked with a wire, for example. Recently, a fuel injection device has been also utilized for a motorcycle instead of a carburetor. Accordingly, control of throttle valve opening and control of fuel injection amount with a fuel injection device based on a signal has been performed as measuring a rotation angle of a grip and outputting the measured rotation angle as the signal.

Rotation angle detecting means which detects increase and decrease of the rotation angle (i.e., the rotation amount) of the grip is disposed to the grip, so that the signal corresponding to the rotation angle of the grip is outputted.

When the grip is operated in one rotation direction with an operator's hand, the rotation angle detecting means detects increase of the rotation angle in the one rotation direction. Then, the signal indicating the increase of the rotation angle is outputted to a control unit, so that control is performed to increase opening of the throttle valve, for example.

In contrast, when the operator rotates the grip rotated in the one rotation direction to return in the other rotation direction or the grip is rotated to return in the other rotation direction by urging means connected to the grip with releasing of the operator, the rotation angle detecting means detects decrease of the rotation angle in the one rotation direction. Then, the signal indicating the decrease of the rotation angle is outputted to the control unit, so that control is performed to decrease opening of the throttle valve, for example.

Here, for example, the rotation angle detecting means to detect the rotation angle of the grip may be a potentiometer or may be constituted with a magnet which is rotated with the grip and a detection element to detect a magnetic field (i.e., variation of a magnetic field) such as a Hall element and a magnetoresistance element.

In essence, such an accelerator device is provided with the grip, the rotation angle detecting means which detects the rotation angle of the grip as described above, and the urging means which urges the grip to return toward an original point.

For example, in such an accelerator device, an arc-shaped sector gear which corresponds to a rotation range being less than one turn of the grip is disposed to the grip. A gear of which diameter is smaller than the grip is engaged with the sector gear as being interlocked. Then, a potentiometer is disposed to one side face side of the gear as the rotation angle detecting means being coaxial with the gear. Further, there has been proposed to dispose urging means for returning toward an original point position respectively to both of the gear and the grip. For example, see Japanese Patent Publication No. 2002-264876. Here, in the above example, the urging means at the gear side is disposed to the gear at the potentiometer side.

There has also been disclosed another example including a sector gear which is arranged in an arc shape along the circumferential direction of a grip at a base end side of the grip, a detected body having a magnet as being formed in an arc shape to be overlapped with the sector gear at a position being shifted against the sector gear in the axial direction of the grip, a detection element which detects magnetic field variation of the detected body caused by rotation of the grip, and urging means for returning to an original point disposed to the gear. For example, see Japanese Patent Publication No. 2008-162420.

Further, there has been proposed another example in which a roller which is integrally rotated with a grip as being placed coaxially therewith is disposed to the grip, a rotary body being adjacent to the roller is to be rotated as being interlocked with the grip by arranging mutually-engaging gears respectively around the roller and the rotary body, a north-pole and a south-pole of a magnet are disposed to the rotary body, and urging means is disposed to the grip. For example, see Japanese Patent Publication No. 2005-041259.

In this example, a magnetoresistance element is utilized for detecting magnetic field variation due to magnet movement. Then, a concave portion to which a convex portion of the center of the rotary body is inserted is disposed to the case, so that the rotary body is rotatably supported by the case. Further, the magnetoresistance element is fixed to the cover which covers an opening of the case as being opposed to the case.

In the above examples, the urging means adopts a torsion coil spring and the like, for example.

When the urging means is disposed to the grip as disclosed in Japanese Patent Publication No. 2002-264876 and Japanese Patent Publication No. 2008-162420, the torsion coil spring is arranged at the outside of the handlebar because an end part of the handlebar is placed at the inside of the grip. Accordingly, the spring diameter becomes large, so that miniaturization of the accelerator device is difficult to obtain.

Further, in a case that the magnet is disposed to the grip as the detected body for the rotation angle detecting means, the magnet rotatably moved along with the grip is required to be placed at the outside from the outer circumference of the handlebar. Accordingly, the outer diameter of the accelerator device is enlarged.

Here, since the rotation angle of the grip for accelerator operation is not so large, the magnet is required to be large in order to enlarge a magnetic variation amount due to magnetic rotational movement to be detected by the detecting body. As a result of the above, when the magnet for detecting the rotation angle is disposed to the grip side, miniaturization of the accelerator device is difficult to obtain.

Further, in the structure that magnetic field variation due to rotational movement of the magnet as described in Japanese Patent Publication No. 2008-162420 and Japanese Patent Publication No. 2005-041259, when the magnet is disposed to the grip and the detection element is fixed to a case, cover or the like which is fixed to the handlebar, there is a possibility that the magnet disposed to the grip is moved in the axial direction of the grip along with the grip against the detection element owing to clearance between the grip and the case or the cover which restricts the axial position of the grip, deformation of these components, and the like. In this case, the magnet is moved in the axial direction of the grip against the detection element.

In a case that the magnet is moved in the axial direction against the detection element, output of the detection element is shifted compared to a case that the magnet is moved only rotationally against the detection element. Accordingly, detection accuracy of the rotation angle of the grip is worsened.

Further, in Japanese Patent Publication No. 2005-041259, the magnet is disposed not to the grip but to the rotary body and the detection element is hold by the cover. Accordingly, when an impact and external force are applied to the grip during travelling, the rotary body having the magnet is moved in the direction other than the rotation direction as a result of clearance variation at a section which rotatably holds the rotary body, deformation of the case and cover, and the like. Accordingly, output of the detection element is varied.

To address the above issues, the present disclosure provides an accelerator device capable of improving detection accuracy of a rotation angle of a grip while achieving miniaturization.

SUMMARY

In order to achieve the above, provided is an accelerator device to output a signal based on a rotation angle of a repeatedly-rotatable grip including a rotary body which rotates with rotation of the grip, a magnet which rotates with rotation of the rotary body, a rotation angle detector which detects a rotation angle of the grip based on magnetic field variation due to rotation of the magnet, and an urging member which returns the grip to an original point position by urging the rotary body. Here, the magnet may be disposed to one side face of the rotary body and the urging member may be disposed to the other side face of the rotary body.

Since the urging member which returns the grip to the original point position and the magnet being the detected body for detecting the rotation angle of the grip are disposed to the rotary body which rotates with rotation of the grip, miniaturization can be achieved.

Since the handlebar is inserted to the inside of the grip, to dispose another member to the grip, the another member is required to be disposed to the outer circumferential side of the cylindrical grip since it can not be disposed at the inner circumferential side. When the member is disposed at the outer circumferential side, a diameter of a section of the grip having the member disposed thereto becomes large, so that miniaturization becomes difficult. In contrast, it is possible for the rotary body to decrease the diameter of itself and to dispose a member to the inner side from the outer circumferential portion of the rotary body. Accordingly, miniaturization can be achieved by disposing the magnet and the urging member to the rotary body side.

Further, since the magnet may be disposed to one side face of the rotary body and the urging member may be disposed to the other side face thereof, it is possible to dispose the rotation angle detector (i.e., the detection element) which detects magnetic field variation due to magnet rotation to the one side face side of the rotary body and to dispose the urging member to the side face being opposite thereto. Accordingly, the structure is prevented from being complicated as the rotation angle detector and the urging member are disposed at the same side, so that operability of assembling the accelerator device can be improved. In addition, it is possible that the rotary body is in a state of being urged to the rotation angle detector side by the urging member. Accordingly, positional displacement between the rotary body and the rotation angle detector due to an impact etc. can be prevented, so that output variation of the rotation angle detector due to the displacement can be prevented.

The urging member and the magnet may be placed coaxially.

Since the urging member and the magnet may be placed coaxially, rotation of the rotary body can be smoothed and stabilized. For example, in a case that a bearing structure has slight clearance to cause axis center shifting of the rotary body, the smooth rotation prevents the rotary body and rotation center of the magnet from being shifted. Accordingly, detection accuracy can be improved with the structure of detecting the rotation angle of the magnet by the rotation angle detector (i.e., the detection element). Here, the urging member and the magnet are required to be approximately symmetric against the axis and the rotary body is preferably placed coaxially.

A separation member which separates the rotary body having the magnet and the rotation angle detector may be disposed therebetween, and bearing means which rotatably holds the rotary body may be disposed to the separation member.

Since the separation member may be disposed between the rotary body having the magnet and the rotation angle detector, it is possible to prevent entering of abrasion powders etc., for example, generated in accordance with rotation of the rotary body into the side to which the rotation angle detector is disposed. Accordingly, electronic equipment such as the detecting element of the rotation angle detector can be prevented from being influenced by abrasion powders.

Further, since the bearing member which rotatably holds the rotary body is disposed to the separation member and the rotation angle detector is disposed to the side of the separation member opposite to the rotary body, the axial position of the rotary body is stabilized against the separation member. With this structure, the positional relation between the magnet of the rotary body and the rotation angle detector is prevented from being shifted, so that output variation of the rotation angle detector due to the shift can be prevented.

The rotation angle detector may be held by the separation member, and the rotation angle detector, the rotary body and the magnet may be placed coaxially.

Since the rotary body may be held at one side face side of the separation member by the bearing means and the rotation angle detector is held at the other side face side of the separation member, the positional relation between the rotation angle detector and the magnet disposed to the rotary body is not to be shifted even in a case that the separation member is moved. Accordingly, output variation of the rotation angle detector due to the shift can be surely prevented.

Further, since the rotation angle detector, the rotary body and the magnet may be coaxially placed, the distance between the rotation angle detector and the magnet is not varied even when the rotary body is rotated. Accordingly, output variation of the rotation angle detector due to the distance variation can be surely prevented. Accordingly, output accuracy of a signal outputted from the rotation angle detector can be improved.

Here, the detection element is required to be placed at the position being the axis center of the rotation angle detector.

In particular, since the rotation angle detector is held by the separation member, the rotation angle detector and the bearing means for the rotary body having the magnet are held by the separation member. Hence, the positional relation therebetween is not shifted against the separation member, so that the distance variation between the rotation angle detector and the magnet is prevented more surely. Accordingly, output variation of the rotation angle detector due to the distance variation can be surely prevented.

The urging member and the magnet may be placed coaxially, the grip may include an operating-side grip portion and a driven-side grip portion as being divided in the axial direction, the operating-side grip portion and the driven-side grip portion may respectively include an engaging portion which transmits rotary motion as being mutually engaged, and the engaging portions may be mutually engaged so that axial movement of the operating-side grip portion against the driven-side grip portion is allowed.

Even if the operating-side grip portion which is projected to the outside is moved in the axial direction with an impact received from the outside, the driven-side grip portion can be prevented from being moved along with the axial movement of the operating-side grip. With this structure, it is possible stabilize output from the rotation angle detector as preventing positional variation, to be caused by movement other than the magnet rotation, between the rotation angle detector and the magnet.

According to the present disclosure, accuracy and reliability of rotation angle detection can be improved and output characteristics of signal output can be improved be stably maintaining location of a detected body (i.e., a magnet) against a detecting body while achieving miniaturization of an accelerator device.

BRIEF DESCRIPTION OF THE DRAWINGS

These and/or other aspects and advantages will become apparent and more readily appreciated from the following description of the embodiments, taken in conjunction with the accompanying drawings of which.

DESCRIPTION OF EMBODIMENTS

Figure 1:
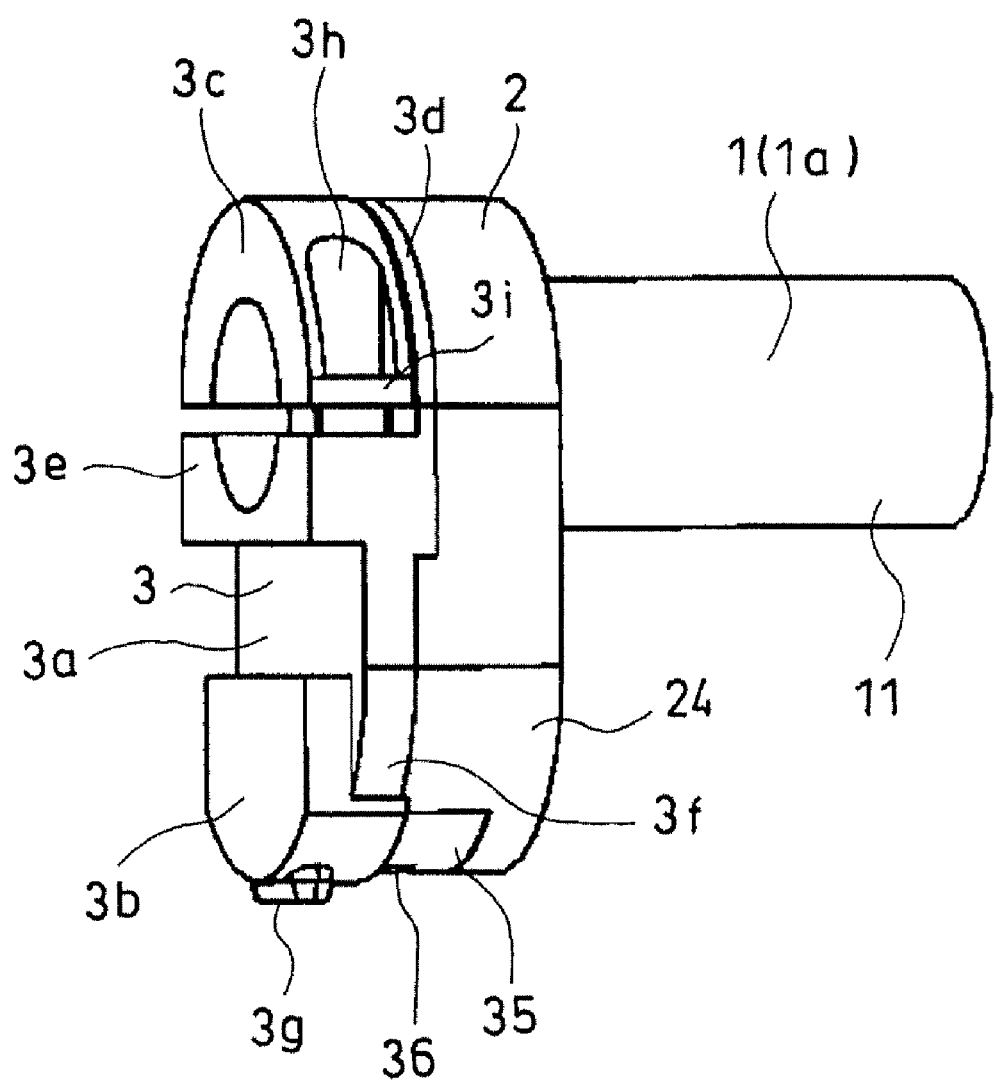
FIG. 1 is a perspective view illustrating an accelerator device according to the first embodiment of the present disclosure.

Reference will now be made in detail to the embodiments, examples of which are illustrated in the accompanying drawings, wherein like reference numerals refer to the like elements throughout. The embodiments are described below to explain the present disclosure by referring to the figures.

Figure 2:
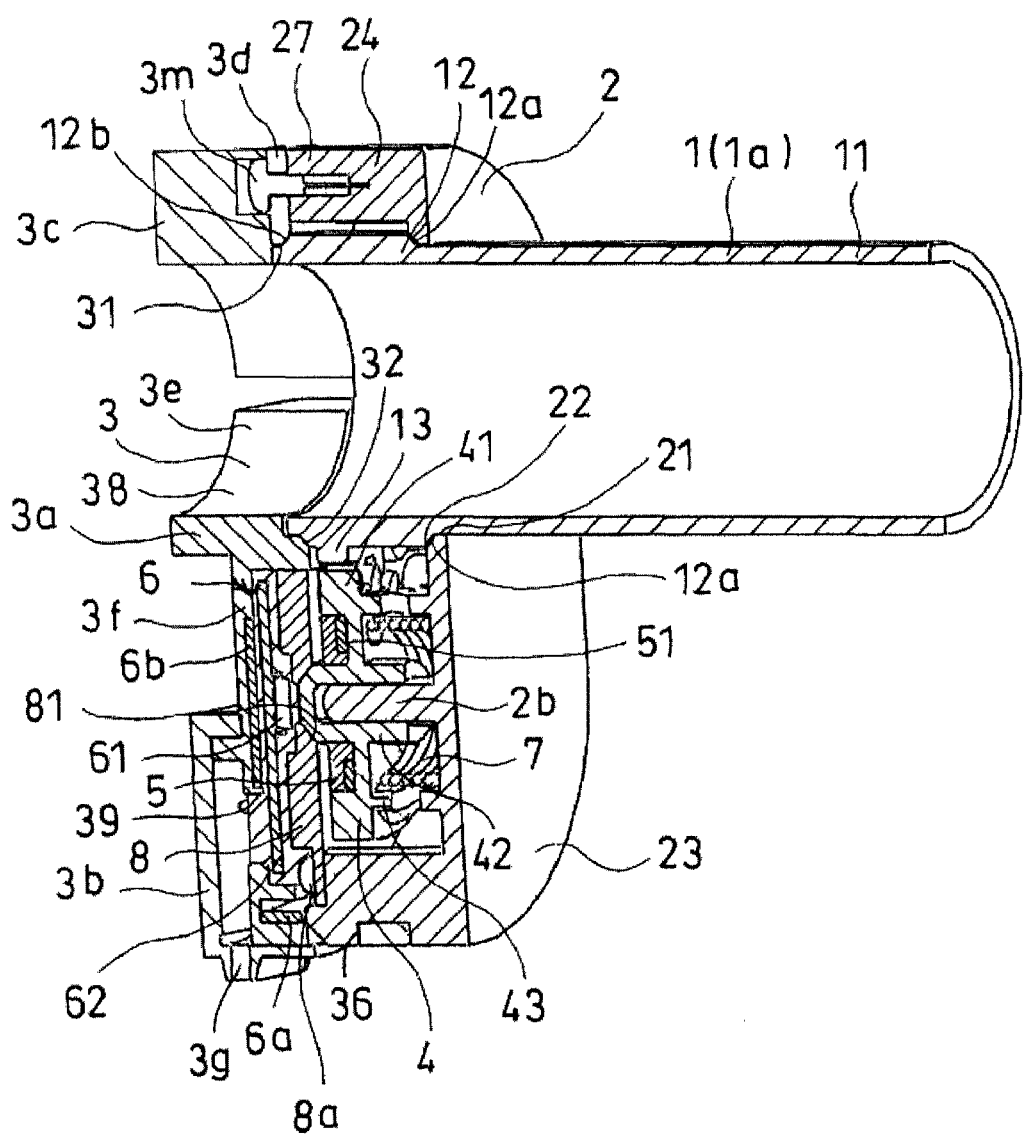
FIG. 2 is a sectional perspective view illustrating the accelerator device.
Figure 3:
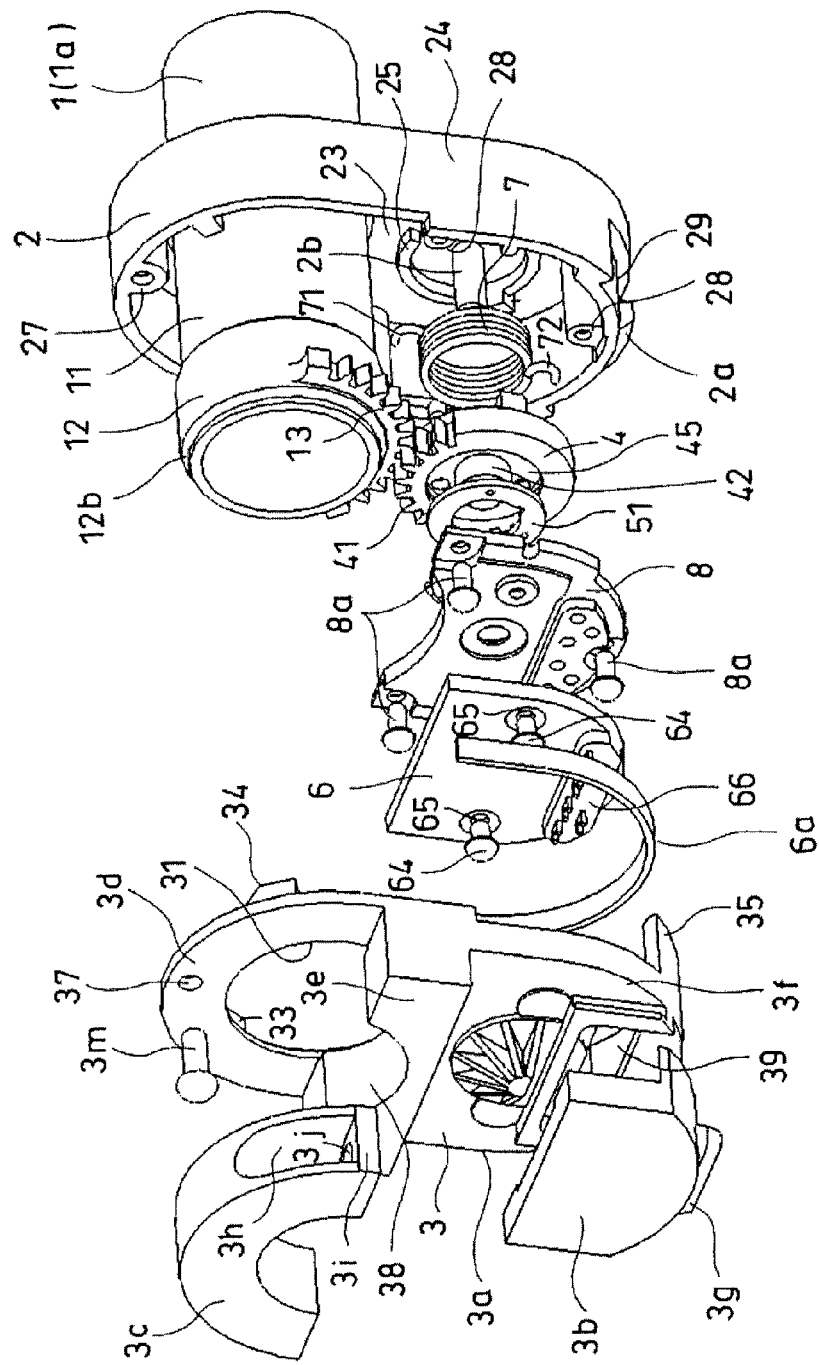
FIG. 3 is an exploded perspective view illustrating the accelerator device.
Figure 4:
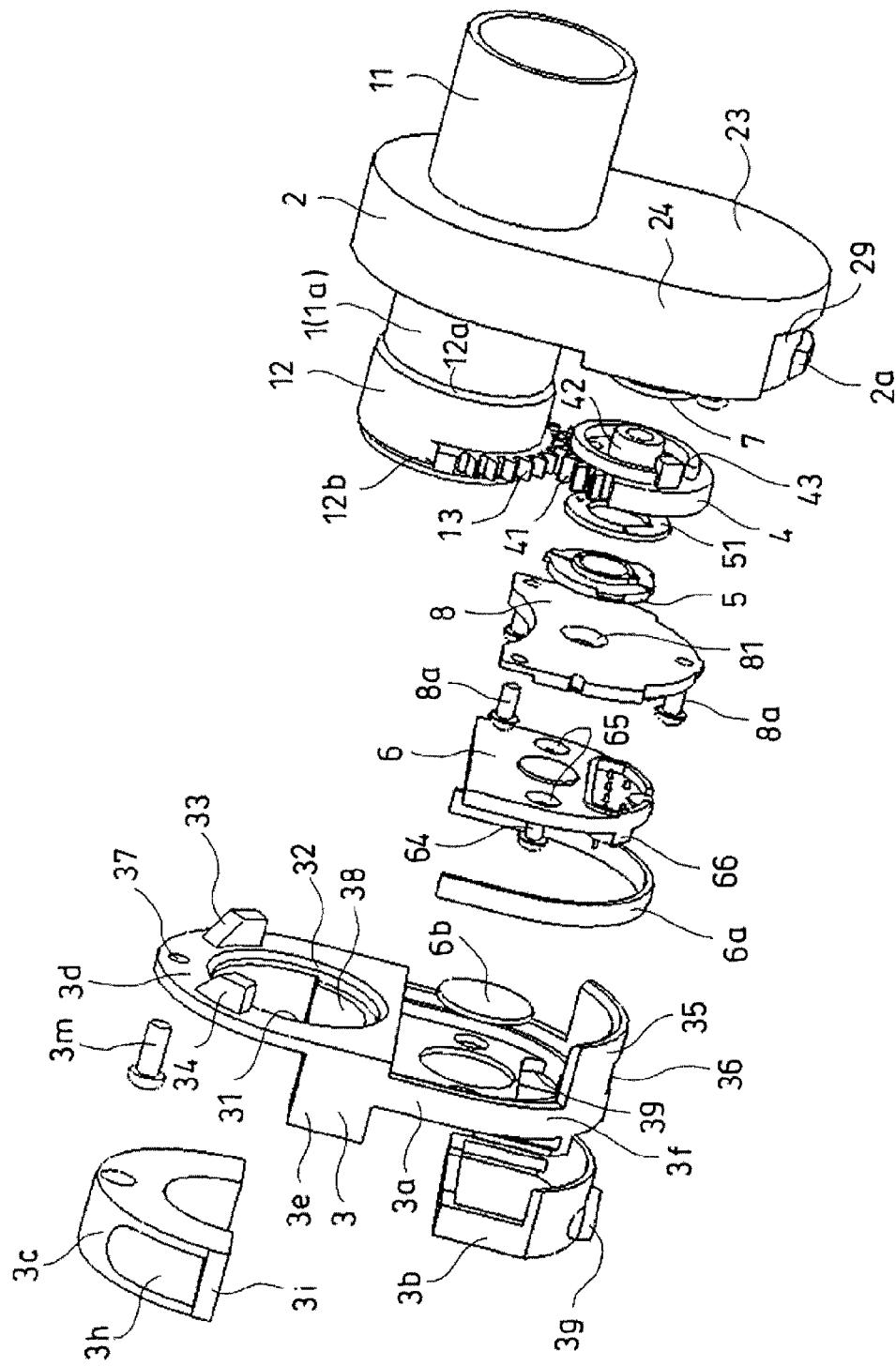
FIG. 4 is an exploded perspective view illustrating the accelerator device.

FIG. 1 is a perspective view illustrating an accelerator device of the first embodiment of the present disclosure. FIG. 2 is a sectional perspective view illustrating the accelerator device. FIGS. 3 and 4 are exploded perspective views illustrating the accelerator device.

The accelerator device being inserted to an end part of a handlebar (not illustrated) is provided with a cylindrical grip 1 disposed to the handlebar, a case 2 arranged so as to surround a base end part of the grip 1, and a cover 3 fixed to the case 2.

Further, in the case 2 and cover 3 of the accelerator device, there are provided a rotary body 4 which rotates with rotation of the grip 1, a magnet 5 which rotates with rotation of the rotary body 4, rotation angle detector 6 which detects a rotating angle of the grip 1 based on magnetic amount variation due to rotation of the magnet 5, and urging member 7 which returns the grip 1 to an original point position by urging the rotary body 4 in the rotation direction.

Further, in this example, the accelerator device includes a separation member 8 disposed between the rotary body 4 having the magnet 5 and the rotation angle detector 6.

The illustrated section of the grip 1 is a grip cylinder member 1a to be a center portion of the entire grip 1. For example, a grip cover (not illustrated) is fixedly attached therearound. An operator operates to rotate the grip cylinder member 1a about the axis thereof as grasping the grip cover.

The grip cylinder member 1a includes a small-diameter portion 11 at the distal side from the base end part which is laterally at the center side of the handlebar and a large-diameter portion 12 at the base end part side of which diameter is enlarged with larger thickness than that of the small-diameter portion 11. Here, the large-diameter portion 12 is formed to have small diameter as being same diameter as that of the small-diameter portion 11 at the base end of the grip cylinder member 1a.

Then, the small-diameter portion 11 is cylindrical as being axially longer than the large-diameter portion 12 and the abovementioned grip cover is fixed to an outer circumferential face of the small-diameter portion 11.

The large-diameter portion 12 is placed in an internal space which is surrounded by the case 2 and the cover 3. Then, a transition portion is formed respectively at the base end side end portion and distal end side end portion of the large-diameter portion 12 along the axial direction respectively toward the small-diameter portions at the base end side and the distal end side therefrom. The transition portions are cone-frustum-shaped taper faces 12a, 12b of which diameter is decreased toward the ends (i.e., axially opposite sides from the center) of the large-diameter portion 12.

Then, the taper face 12a at the distal end part of the large-diameter portion 12 is contacted (i.e., face-contacted) to a taper face 22 of an inner circumferential face of a later-mentioned grip penetration hole 21 which is formed at the case 2, so that movement of the large-diameter portion 12 to the distal end side is restricted.

Here, the taper face 22 has a structure in which the diameter is decreased toward the distal end side of the grip cylinder member 1a.

Further, the taper face 12b at the base end part of the large-diameter portion 12 is contacted (i.e., face-contacted) to a taper face 32 of an inner circumferential face of a later-mentioned grip penetration hole 31 which is formed at the cover, so that movement of the large-diameter portion 12 to the base end side is restricted.

With this structure, movement of the grip cylinder member 1a (i.e., the grip 1) against the handlebar along the axial direction of the handlebar and the grip cylinder member 1a is restricted by the cover 3 fixed as described later and the case 2 fixed to the cover 3. Here, it is also possible that the grip cylinder member 1a is in a state to axially move slightly by the amount of clearance. Even in such a state, measurement of the rotation angle of the grip 1 is not influenced thereby in the accelerator device of the first embodiment.

Then, an arc-shaped sector gear 13 is arranged at the base end part side of the large-diameter portion 12 along an outer circumference of the large-diameter portion 12 over a predetermined angle range.

The sector gear 13 is to transmit rotation of the grip 1 (i.e., the grip cylinder member 1a) to the rotary body 4 as being engaged with a later-mentioned sector gear 41 which is formed at the rotary body 4.

Here, the sector gear 13 formed as being projected outward from the outer circumferential face of the large-diameter portion 12 is in a state that a projected portion which is arc-shaped and wave-shaped is formed at the large-diameter portion 12.

Both end parts of the sector gear 13 along the circumferential direction are capable of being contacted to two stopper members 33, 34 which are formed as being projected from a face of a portion being periphery of the grip penetration hole 31 of the cover 3 facing to the case 2 side (i.e., a face facing to the distal end side of the grip 1). When the grip 1 is rotated in one rotational direction, rotation of the grip 1 is restricted as one end part of the sector gear 13 being contacted to one stopper member 33. When the grip 1 is rotated in the other rotational direction, rotation of the grip 1 is restricted as the other end part of the sector 13 being contacted to the other stopper 34. In this manner, the grip 1 is to be rotated within the predetermined angle range. The sector gear 13 is formed in an angle range corresponding to the angle range within which the grip 1 is rotatable.

The case 2 being a member having an oval shape connecting two semicircles with a rectangle includes an oval bottom plate 23 and a surrounding wall 24 which is formed so as to surround the bottom plate 23 at a peripheral edge part of the bottom plate 23.

The grip penetration hole 21 is formed so that the center thereof is located at an approximate center of one semicircle of the oval-shaped bottom plate 23 of the case 2. The inner diameter of the grip penetration hole 21 is larger than the outer diameter of the small-diameter portion 11 of the grip cylinder member 1a and is smaller than the outer diameter of the large-diameter portion 12, so that movement of the grip 1 is restricted as described above.

Here, the case 2 and the cover 3 are combined to have a shape of an oval cylinder. Having a boundary between the two semicircles of the oval, a section being one semicircle side forms a space to accommodate the large-diameter portion 12 of the grip cylinder member 1a and a section being the other semicircle side forms a space to accommodate the rotary body 4 having the magnet 5, the urging member 7, the rotation angle detector 6, the separation member 8 and the like.

Further, a shaft portion 2b rotatably supporting the rotary body 4 is formed at a side face of the bottom plate 23 being the inner face side of the case 2 not at the one semicircle side having the grip penetration hole 21 but at the approximate center of the other semicircle. Here, the shaft portion 2b is formed in a direction perpendicular to the bottom plate 23 as being placed in parallel to the axial direction of the grip cylinder member 1a.

Further, a spring positioning portion 25 which is an approximately circular convex portion having the shaft portion 2b as the center is arranged around the shaft portion 2b at the inner face of the bottom plate 23 to which the shaft portion 2b is formed. The inner diameter of the spring positioning portion 25 is approximately the same as the outer diameter of the urging member 7 being a torsion coil spring. The urging member 7 is placed in a positioned state as one end part thereof being accommodated in the spring positioning portion 25.

A boss 27 having a hole in which a screw 3m is screwed for fixing the cover 3 is formed at a center part of the inner circumferential side of the surrounding wall 24 at the semicircle section in which the grip cylinder member 1a is accommodated.

Further, bosses 28 in which screws 8a for fixing the separation member 8 are respectively screwed are formed at a center part of the surrounding wall 24 at the semicircle section in which the rotary body 4 etc. is accommodated and at the inner circumferential portions of the two linear sections of the surrounding wall 24.

Further, a concave portion 29 is formed at the center part of the outer circumferential side of the surrounding wall 24 at the semicircle section in which the rotary body 4 etc. is accommodated as being at the cover 3 side. The concave portion 29 is formed until an end face of the surrounding wall 24 at the cover 3 side so that a later-mentioned engaging arc plate 35 of the cover 3 can be placed. Here, an engaging projection 2a is formed to project approximately at the center of the concave portion 29.

The engaging projection 2a is engaged with an engaging opening 36 formed at the engaging arc plate 35 which is to be in a state of being accommodated in the concave portion 29, so that the cover 3 and the case 2 are joined at portions in which the rotary body 4 is accommodated. Here, since a side face of the engaging projection 2a at the cover 3 side is formed as a taper face, the engaging arc plate 35 smoothly climbs the engaging projection 2a when being moved to the case 2 side.

The cover 3 is fixed to the handlebar while closing an oval opening which is located at the opposite side to the bottom plate 23 of the closed-end cylindrical case 2. The cover 3 is constituted with a cover body 3a, a terminal cover 3b and a bar-fixing member 3c.

The cover body 3a includes a plate-shaped portion 3d which constitutes the semicircle section in which the grip cylinder member 1a is accommodated, a bar sandwiching portion 3e which sandwiches the handlebar with the bar-fixing member 3c as being opposed thereto, a cap portion 3f which is arranged at the side accommodating the rotary body 4, the rotation angle detector 6 and the like.

The grip penetration hole 31 is formed across the plate-shaped portion 3d and the bar-sandwiching portion 3e. The grip penetration hole 31 has an inner diameter which is larger than the outer diameter of the small-diameter portion 11 and is smaller than the outer diameter of the large-diameter portion 12 of the grip cylinder member 1a.

The plate-shaped portion 3d is formed like a semicircle-arc shape with a certain width as the grip penetrating hole 31 being formed thereat. Further, a screw hole 37 through which the screw 3m passes is formed at a center part of the semicircle. The bar-sandwiching portion 3e is formed as being projected laterally at the center side of the handlebar to transverse the linear sections of the oval at a half being the side to which the grip cylinder member 1a is accommodated. In addition, the bar-sandwiching portion 3e is formed to have an arc-shaped inner circumferential face 38 which is faced to the bar-fixing member 3c as being contacted to the outer circumferential face of the handlebar at a side face toward the semicircle side (i.e., toward the plate-shaped portion 3d). The inner circumferential face 38 is formed in a state of being continued to the abovementioned inner circumferential face of the grip penetration hole 31.

Then, the bar-sandwiching portion 3e and the bar-fixing member 3c sandwich the handlebar, so that the accelerator device is fixed to the handlebar. Here, the inner diameter of the inner circumferential face 38 is approximately the same as the outer diameter of the handlebar.

The cap portion 3f closes opening of a half of the case 2 at the side to which the rotary body 4 and the rotation angle detector 6 are arranged. Further, the cap portion 3f has an opening portion 39 through which wire-connection is performed between terminals of the rotation angle detector 6 and a connection portion 3g arranged at the terminal cover 3b.

Further, the abovementioned engaging arc plate 35 is extended to the case 2 side at the semicircle side of the oval.

The engaging arc plate 35 is formed in an arc shape which is the same shape as the arc of the semicircle section and is provided with the engaging opening 36.

The terminal cover 3b is fixed to the cap portion 3f and is fitted to a convex portion formed around the opening portion 39 of the cap portion 3f, so that the opening portion 39 is closed. Further, the connection portion 3g having connection terminals wire-connected to the terminals of the rotation angle detector 6 is arranged at the terminal cover 3b so as to enable connection of the rotation angle detector 6 to a control device which controls a throttle valve and a fuel injection device.

The bar-fixing member 3c has an approximate semicircle-arc shape which as a whole is formed as the outer diameter of the outer circumferential face side thereof being the same as that of the semicircle section of the cover body 3a, so that the inner diameter of the inner circumferential face side is approximately the same as the outer diameter of the handlebar. Further, a concave portion 3h capable of accommodating a screw is formed at each outer circumferential face side of the lateral end parts of the bar-fixing member 3c. A screw hole 3j is formed at a bottom portion 3i of an end face side of the bar-fixing member 3c of the concave portion 3h.

Then, the bar-fixing member 3c is fixed with screwing to the bar-sandwiching portion 3e of the cover body 3a to face the bar-sandwiching portion 3e in a state that the handlebar is sandwiched by the bar-fixing member 3c and the cover body 3a. Consequently, the cover 3 can be fixed to the handlebar. In addition, the case 2 is fixed to the cover 3 by fastening the screw 3m and engaging between the engaging projection 2a of the concave portion 29 and the engaging opening 36 of the engaging arc plate 35. Accordingly, the entire accelerator device is fixed to the handlebar.

The rotary body 4 is approximately disc-shaped and includes a cylindrical shaft portion 42 which is covered-cylinder-shaped at the center part thereof.

The cylindrical shaft portion 42 is projected to the cover 3 side of the rotary body 4 (i.e., the base end side of the grip 1) while being projected to the case 2 bottom plate side of the rotary body 4 (i.e., the distal end side of the grip 1). Here, the cylindrical shaft portion 42 is in a state of being opened at the distal end side and being closed with a cover at the base end side.

The shaft portion 2b projected from the bottom plate 23 is in a state of being inserted into the cylinder-shaped cylindrical shaft portion 42 from the opening of the cylindrical shaft portion 42 at the side of the bottom plate 23 of the case 2. The inner diameter of the cylindrical shaft portion 42 is slightly larger than the outer diameter of the shaft portion 2b by the amount of clearance, so that the rotary body 4 is rotatable about the shaft portion 2b.

The end part of the cylindrical shaft portion 42 at the cover 3 side is inserted to a bearing hole 81 being bearing means of the separation member 8, so that the rotation center of the cylindrical shaft portion 42 is maintained at a predetermined position in a state of being inserted to the bearing hole 81. The outer circumferential face of a distal end part of the cylindrical shaft portion 42 is a cone-frustum-shaped taper face of which diameter is decreased toward the end. The inner circumferential face of the bearing hole 81 is a cone-frustum-shaped taper face of which diameter is decreased from the case 2 side (i.e., the distal end side of the grip 1) toward the cover 3 side (i.e., the base end side of the grip 1).

The cylindrical shaft portion 42 is held in a state that the shaft center thereof is located at the center of the bearing hole 81 owing to action between the abovementioned taper faces as a result of that the rotary body 4 is pressed toward the separation member 8 side by the urging member 7 as described above. Accordingly, the rotating center of the rotary body 4 is continuously located at the center of the bearing hole 81 of the separation member 8, so that the rotary center of the rotary body 4 is continuously in a state of being positioned against the separation member 8.

Further, a spring positioning portion 43 having a similar structure to that of the spring positioning portion 25 formed at the bottom plate 23 is formed at a side face of the rotary body 4 at the bottom plate 23 side of the case 2.

With this structure, the other end part of the urging member 7, the torsion coil spring, is positioned at the inside of the spring positioning portion 43 which is an annular convex portion.

Further, an annular groove 45 which is a groove having a circular ring shape of which the center is at the cylinder shaft portion 42 is formed around the cylinder shaft portion 42 at a side face of the rotary body 4 at the cover 3 side. A later-mentioned annular armature 51 and the annular magnet 5 are placed in the annular groove 45 in a state of being integrally formed.

Further, the sector gear 41 is formed in an arc shape at a part of the outer circumference of the rotary body 4. The sector gear 41 is in a state of being engaged with the sector gear 13 of the grip cylinder member 1a. The grip cylinder member 1a and the rotary body 4 are mutually adjacent while rotation center axial directions thereof are mutually in parallel. The formed range of the sector gear 41 of the rotary body 4 corresponds to the sector gear 13 of the grip cylinder member 1a and the rotatable range thereof. The engaged state between the sector gear 41 of the rotary body 4 and the sector gear 13 of the grip cylinder member 1a can be maintained in the rotatable range of the grip cylinder member 1a defined as described above. Here, since the rotary body 4 is formed so that the diameter thereof is smaller than that of the large-diameter portion 12 of the grip cylinder member 1a, a rotation angle of the rotary body 4 is larger than a rotation angle of the grip 1 when the grip 1 is rotated.

The magnet 5 is formed annularly as one semicircular section being a north pole and the other semicircular section being a south pole. Here, owing to being annularly-shaped, the shape is symmetric with respect to the axis. Further, the rotary body 4 and the magnet 5 are placed coaxially and each axis center thereof is the rotation center.

The armature 51 is arranged at a face of the magnet 5 at the rotary body 4 side in a state of being contacted thereto. The armature 51 is also formed annularly and is rotated coaxially with the magnet 5 and the rotary body 4 and each axis center thereof is the rotation center. The armature 51 closes magnetic flux and suppresses demagnetization of the magnet 5.

Here, the armature 51 is arranged to the magnet 5 at the opposite side to the rotation angle detector 6. The magnetic flux of the magnet 5 passes through the armature 51 while passing through a space at the rotation angle detector 6 side.

Then, the magnet 5 and the armature 51 are fixed as being rotatable integrally with the rotary body 4 in a state of being accommodated in the annular groove 45 of the rotary body 4.

The urging member 7 is a torsion coil spring which is fixed, where the positioning thereof is performed respectively to the inner face of the bottom plate 23 of the case 2 and the side face of the rotary body 4 at the bottom plate 23 side, as described above. Further, engaging pieces 71, 72 formed at both ends of the torsion coil spring are connected respectively to the bottom plate 23 and the rotary body 4. When deformation is generated as being twisted with rotation of the rotary body 4 against the bottom plate 23, urging force is generated in the direction opposite to the rotation of the rotary body 4. In this manner, force returning the rotary body 4 into an original state is exerted when the rotary body 4 is rotated.

Since the axis center of the torsion coil spring is approximately cylinder-shaped and the axis center (i.e. the rotation center) of the rotary body are matched as being coaxially arranged, the force of the torsion coil spring in the torsion direction is exerted in the circumferential direction as the rotation center of the rotary body is the center.

Here, the axis center of the torsion coil spring and the axis center of the magnet 5 and the armature 51 which are annularly shaped are matched. That is, the urging member 7 which is the torsion coil spring, the magnet 5 and the armature 51 are coaxially placed.

Further, the urging member 7 which is the torsion coil spring is in a compressed state in the direction of the shaft portion 2b as being disposed between the rotary body 4 and the bottom plate 23. Accordingly, the urging member 7 is in a pressing state as urging the rotary body 4 toward the separation member 8 side as a compression coil spring. With this structure, the rotation center of the rotary body 4 is maintained at a constant position against the separation member 8 and a distance between the rotary body 4 and the separation member 8 is maintained at constant as well. In this manner, the urging member 7 functions as the compression coil spring as well as the torsion coil spring.

The rotation angle detector 6 is formed so that the whole shape thereof is to be a shape obtained by adding a rectangular to a semicircle which is a sectional shape of the case 2 and the cover 3 (i.e., a shape of a half of an oval) at the side of the internal accommodation space formed by the case 2 and the cover 3 to which the rotary body 4 and the like are accommodated.

Then, a printed substrate 62 on which a magnetic detection IC 61 is placed at the inside thereof. Here, periphery of the printed substrate 62 on which the magnetic detection IC 61 is mounted is covered by synthetic resin, for example.

The magnetic detection IC 61 is constituted with a magnetic detection element and an integrated circuit which outputs a signal from the magnetic detection element. For example, a Hall element, a magnetoresistance element and the like can be utilized as the magnetic detection element.

Here, the magnetic detection element is placed at an approximate center of a side face in a shape of the magnetic detection IC 61. Further, the center position of the magnetic detection IC 61 is located on an extension line of the axis center (i.e., the rotation center) of the rotary body 4. Accordingly, the detection element of the magnetic detection IC 61 is placed coaxially with the magnet 5 and the armature 51 which are placed coaxially with the rotary body 4. With this structure, the detection element can detect a magnetic amount in a state of continuously maintaining the constant distance from the magnet 5 when the rotary body 4 is rotated.

The rotation angle detector 6 having such a magnetic detection IC 61 is fixed with two screws 64 to the separation member 8 at a side thereof opposite to the side to which the rotary body 4 is placed. The rotation angle detector 6 is formed with screw holes 65 to which the screws 64 are to be inserted.

Further, the terminal portion at which terminals 66 of the printed substrate 62 are exposed is formed so as to be projected from the section of the semicircle side to the cover 3 side.

Here, the center part of the plate-shaped rotation angle detector 6 is in a state that the section to which the above magnetic detection IC 61 is disposed is projected to the separation member 8 side.

The separation member 8 has a shape obtained by cutting the oval at the linear sections similarly to the rotation angle detector 6 formed with screw holes 83 at three positions at the periphery thereof and is fixed to the case 2 with the screws 8a. Here, the screws 8a are fastened to sections of the bosses 28 of the case 2 as described above.

Further, the bearing hole 81 having the above cone-frustum-shaped taper face is formed at the approximate center part of the separation member 8. The axis center (i.e., the rotation center) of the rotary body 4 is maintained at the center of the bearing hole 81 while accommodating the taper face at the distal end part of the cylindrical shaft portion 42 of the rotary body 4 and pressing the rotary body 4 to the separation member 8 side by the urging member 7.

Here, the center of the bearing hole 81 of the separation member 8, the rotation center of the rotary body 4, the center of the detection element of the magnetic detection IC 61 of the rotation angle detector 6 which is fixed to the separation member 8, the center of the annular magnet 5, and the center (i.e., the axis center) of the cylindrical-coil-like urging member 7 are placed on a straight line, so that those are placed coaxially.

A slim-plate-shaped magnetic shield 6a bent to be an arc shape is placed at the inner circumferential face of a wall section which surrounds the periphery of a ceiling section of the cap portion 3f of the cover 3 being the side to which the rotation angle detector 6, the rotary body 4 and the like are accommodated so as to surround the rotation angle detector 6. Further, a disc-shaped magnetic shield 6b is also placed to a section of the inner face side of the ceiling plate section of the cap portion 3f which is overlapped with the magnetic detection IC 61 (i.e. the printed substrate 62) in the axial direction of the grip 1.

In the accelerator device as described above, when an operator rotationally operates the grip 1, rotary motion is transmitted between the sector gear 13 of the grip cylinder member 1a and the sector gear 41 of the rotary body 4 engaged with the sector gear 13, and then, the rotary body 4 is rotated. At that time, the torsion coil spring being the urging member 7 is loaded by the rotary body 4. Accordingly, the urging force in a rotation direction which is opposite to the rotational operation direction is exerted to the rotary body 4.

Then, when the magnet 5 is rotated integrally with the rotary body 4, the direction of the magnetic flux of the magnet 5 is varied. The magnetic detection IC 61 detects the above and performs outputting to the control device of a throttle valve and a fuel injection device via the terminals of the printed substrate 62.

In the accelerator device, the urging member 7 and the magnet 5 are placed at the side of the rotary body 4 which is rotated with the grip 1 as being interlocked with the grip 1 not at the side of the grip 1. Accordingly, the torsion coil spring being the urging member 7 and the magnet 5 can be formed smaller in diameter compared to a case that the urging member 7 and the magnet 5 are placed at the grip 1 side to which any member is not placed at the inner circumferential side from the handlebar. Therefore, miniaturization of the accelerator device can be achieved. In particular, the diameter at the vicinity of the base end part of the grip 1 can be lessened, so that the accelerator device can be prevented from disturbing operation.

Further, the magnet 5 is located at the rotary body 4 side and large force to move the rotary body 4 in the axial direction is not generated with axial movement of the grip cylinder member 1*a* while only the sector gear 13 and the sector gear 41 are engaged between the rotary body 4 and the grip cylinder member 1*a*. Therefore, even when the grip 1 is axially moved owing to force of an operator, vibration during travelling, force during acceleration and deceleration, force with traveling direction change and the like, the rotary body 4 is not axially moved and variation of positional relation between the magnet 5 and the rotation angle detector 6 can be prevented. Accordingly, it is possible to stabilize output of rotation angle detection by the magnetic detection IC 61.

Further, since the urging member 7 is placed at the one side face of the rotary body 4 and the magnet 5 is placed at the other side face, the rotation angle detector 6 can be placed to the side to which the magnet 5 is placed. Accordingly, operability for assembling the accelerator device can be improved without having a complicated structure in contrast to a case where the rotation angle detector 6 and the urging member 7 are placed at the same side.

Further, since the magnet 5 (i.e., the annular magnet 5) and the urging member 7 (i.e., the torsion coil spring) are placed coaxially, rotation of the rotary body 4 can be smoothed. In particular, since the rotation center of the rotary body 4, the magnet 5 and the urging member 7 are placed coaxially, surplus load can be prevented from being loaded in the direction other than the rotation direction when the rotary body 4 is rotated. Accordingly, it is possible to obtain a structure to smoothly rotate the rotary body 4.

Further, since the rotary body 4 having the magnet 5 and the rotation angle detector 6 are separated by the separation member 8, it is possible to prevent entering of abrasion powders etc., for example, generated in accordance with rotation of the rotary body 4 into the rotation angle detector 6 side. Accordingly, the rotation angle detector 6 can be prevented from being influenced by abrasion powders.

Here, the bearing hole 81 through which communication is performed between the rotation angle detector 6 side and the rotary body 4 side. However, since the bearing hole 81 is in a closed state with the cylindrical shaft portion 42 of the rotary body 4, entering of the abrasion powders can be prevented.

Further, since the rotary body 4 is rotatably supported by the bearing hole 81 being the bearing means of the separation member 8 located between the rotation angle detector 6 and the magnet 5 of the rotary body 4, it is possible to suppress variation of the positional relation between the magnet 5 and the rotation angle detector 6. With this structure as well, it is possible to stabilize output of rotation angle detection.

Further, in this example, the bearing hole 81 of the separation member 8 and the distal end part of the cylindrical shaft portion 42 of the rotary body 4 which is rotatably supported as being inserted to the bearing hole 81 are formed as cone-frustum-shaped taper faces which are approximately face-contacted mutually in the approximate same shape and the urging member 7 also functions as a compression spring to press as urging the rotary body 4 toward the separation member 8 side. Accordingly, force is exerted to the rotary body 4 so that the axis center (i.e., the rotation center) is continuously matched to the center of the bearing hole 81, so that the rotation center position of the rotary body 4 is prevented from being varied against the separation member 8. Further, since the rotary body 4 is continuously urged to the separation member 8 side, the distance between the rotary body 4 and the separation member 8 is not varied.

Further, since the rotation angle detector 6 is fixed to the side of the separation member 8 opposite to the rotary body 4, the position of the rotation angle detector 6 is not varied against the separation member 8. Accordingly, even when the position of the grip 1 is varied with the force as described above or the cover 3 or the case 2 is deformed, the positional relation between the rotation angle detector 6 and the magnet 5 of the rotary body 4 is not to be varied. Accordingly, it is possible to stabilize the output of the rotation angle.

Here, when the positional relation between the detection element and the magnet 5 is varied, output variation of the detection element occurs as a result of the variation of the positional relation therebetween in addition to the output variation of the detection element due to rotation of the magnet 5. Accordingly, the output of the signal which indicates the rotation angle becomes unstable.

Further, since the magnet 5, the detection element of the rotation angle detector 6, and the rotation center of the rotary body 4 are placed coaxially, the positional relation between the magnet 5 and the detection element is not varied with rotation of the rotary body 4. Accordingly, output accuracy can be improved.

Further, the cover 3 is fixed to the handlebar, the case 2 is fixed to the cover 3, and the separation member 8 is fixed to the case 2. That is, the separation member 8 is fixed to the cover 3 via the case 2. Accordingly, even in a case that the cover 3 fixed to the handlebar is deformed with external force, the separation member 8 can be prevented from being deformed. Further, since the rotation angle detector 6 is connected to the case 2 via the separation member 8, the rotation angle detector 6 can be prevented from being deformed.

Accordingly, it is possible to surely prevent output variation of the detection element to be caused by the abovementioned force as preventing shifting of the positional relation of the detection element against the magnet 5 to be caused by deformation of the separation member 8 and the rotation angle detector 6.

Further, in the control device for a throttle valve and a fuel injection device, as a result of output stabilization of the detection element and improvement of output accuracy, it is possible to achieve simplification of a control program as simplifying processes for correction and the like of the signal inputted from the detection element and to obtain more stable control.

Figure 5:
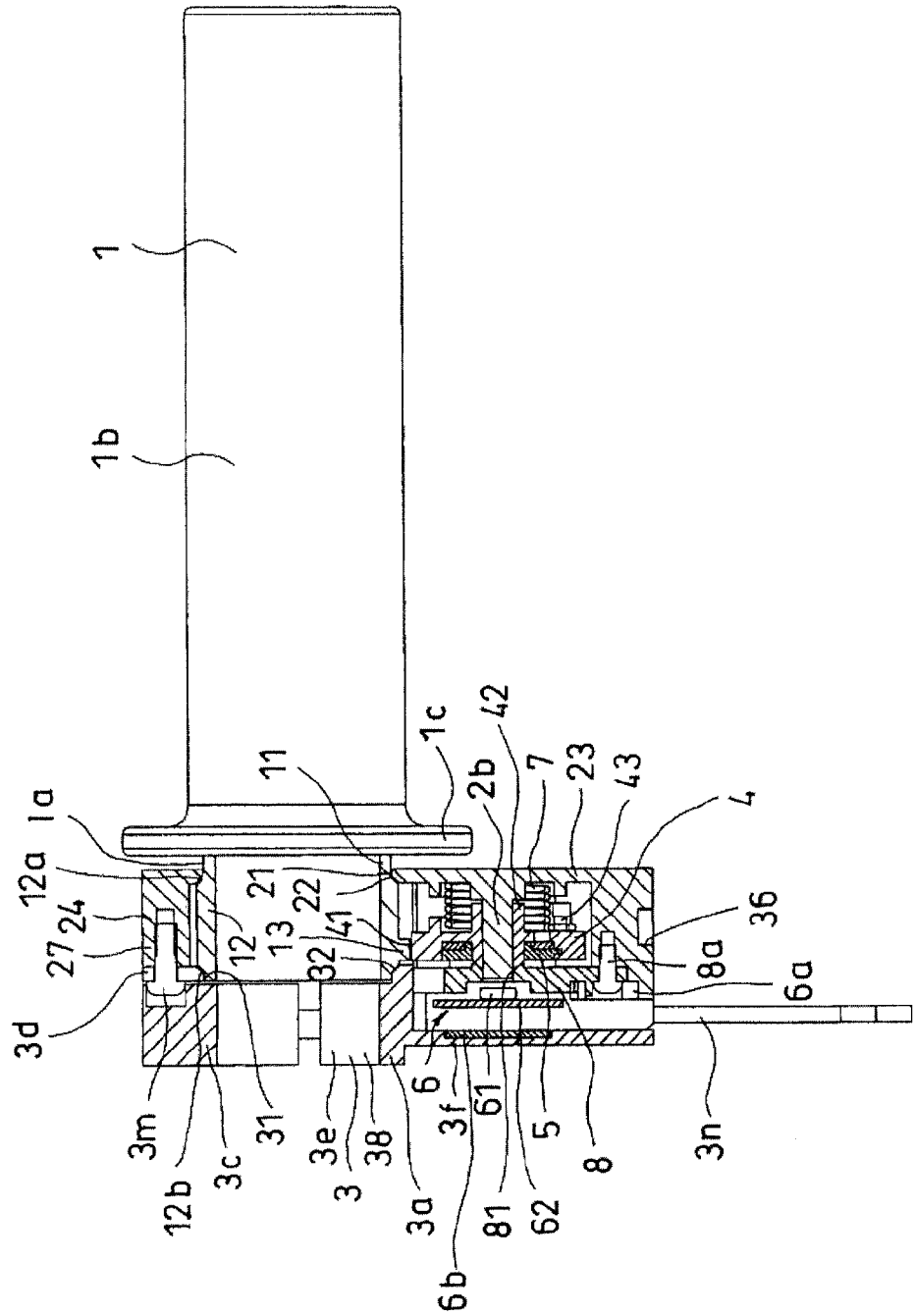
FIG. 5 is a sectional view illustrating an accelerator device according to the second embodiment of the present disclosure.

FIG. 5 is a sectional view illustrating an accelerator device according to the second embodiment of the present disclosure.

In the accelerator device of the first embodiment, the shaft portion 2*b* is inserted to the rotary body 4 as being formed integrally with the case 2. In the accelerator device of the second embodiment, the shaft portion 2*b* penetrates the rotary body 4 and a distal end part of the shaft portion 2*b* is inserted to the bearing hole 81 of the separation member 8. The structure of the second embodiment other than the above is approximately the same in essence as the first embodiment. Here, the same numerals are given to similar structural elements and the description thereof will not be repeated.

Similarly to the first embodiment, the grip 1 includes the grip cylinder member 1*a* and a grip cover 1*b* having a flange portion 1*c* at the base end portion while being attached to the periphery thereof in a fixed manner.

Further, as described above, the shaft portion 2*b* is in a state that the distal end part of the shaft portion 2*b* is inserted to the bearing hole 81 of the separation member 8 as being extended from the bottom plate 23 of the case 2 at a right angle. The base end part of the shaft portion 2b connected to the bottom plate 23 of the case 2 is inserted to the cylindrical shaft portion 42 of the rotary body 4. Here, the diameter of the base end part of the shaft portion 2b is approximately the same as the diameter of the cylindrical shaft portion 42 as being enlarged in diameter against the part being the distal end part.

In the above example, the cylindrical shaft portion 42 is covered-cylinder-shaped. Here, the cylindrical shaft portion 42 is formed to be cylindrical without being covered to have the shaft portion 2b penetrate therein.

The distal end part of the cylindrical shaft portion 42 is formed as a taper face of a cone-frustum-shape (here, the inside thereof is hollow) of which the diameter is decreased toward the end at a section surrounding an opening of a penetration hole.

The inner circumferential face of the bearing hole 81 of the separation member 8 at the portion of the bottom plate 23 side of the case 2 is a taper face to which the taper face at the distal end of the cylindrical shaft portion 42 is contacted. The magnetic detection IC 61 side thereof is formed as a cylindrical inner circumferential face having approximately the same inner diameter as the outer diameter of the shaft portion 2b, so that the outer circumferential face of the distal end part of the shaft portion 2b and the inner circumferential face of the bearing hole 81 are in a contacted state.

With the above structure, the shaft portion 2b is supported by the bottom plate 23 of the case 2 with which the base end part thereof is integrally formed and the distal end part thereof is to be supported by the separation member 8. Accordingly, it is structured to have high strength against force in the direction perpendicular to the shaft portion 2b. Further, the strength is increased by thickening the base end part of the shaft portion 2b.

With this structure, in a case that the grip 1 is operated and the rotary body 4 is rotated owing to transmitting of the rotation of the grip 1 via the sector gear 13 and the sector gear 41, it is possible to prevent the shaft portion 2b from being deformed to be bent in a direction of being inclined against the force exerted in the direction perpendicular to the shaft portion 2b.

Accordingly, it is possible to surely prevent positional deviation between the magnetic detection IC 61 and the magnet 5 of the rotary body 4 which is rotated having the shaft portion 2b inserted thereto.

Further, since the shaft portion 2b is inserted, the separation member 8 is in a state that the center part thereof is supported by the case 2 via the shaft portion 2b as well as the outer circumferential portion fixed by being screwed. Accordingly, even in a case that an impact is applied to the accelerator device from the outside, deformation of the separation member 8 can be surely prevented.

Here, in the second embodiment, there are some details being different from those of the first embodiment even in a structure not relating to the above shaft portion 2b. For example, the first embodiment adopts a structure to perform wiring to the printed substrate 62 from the outside as connection to connection terminals of the connection portion 3g, that is, to perform wire-connection from the outside via a connector. Meanwhile, in the second embodiment, a lead wire 3n connected to the printed substrate 62 is drawn to the outside. It is also possible to adopt the same structure as that of the first embodiment for details of such a different structure.

Figure 6:
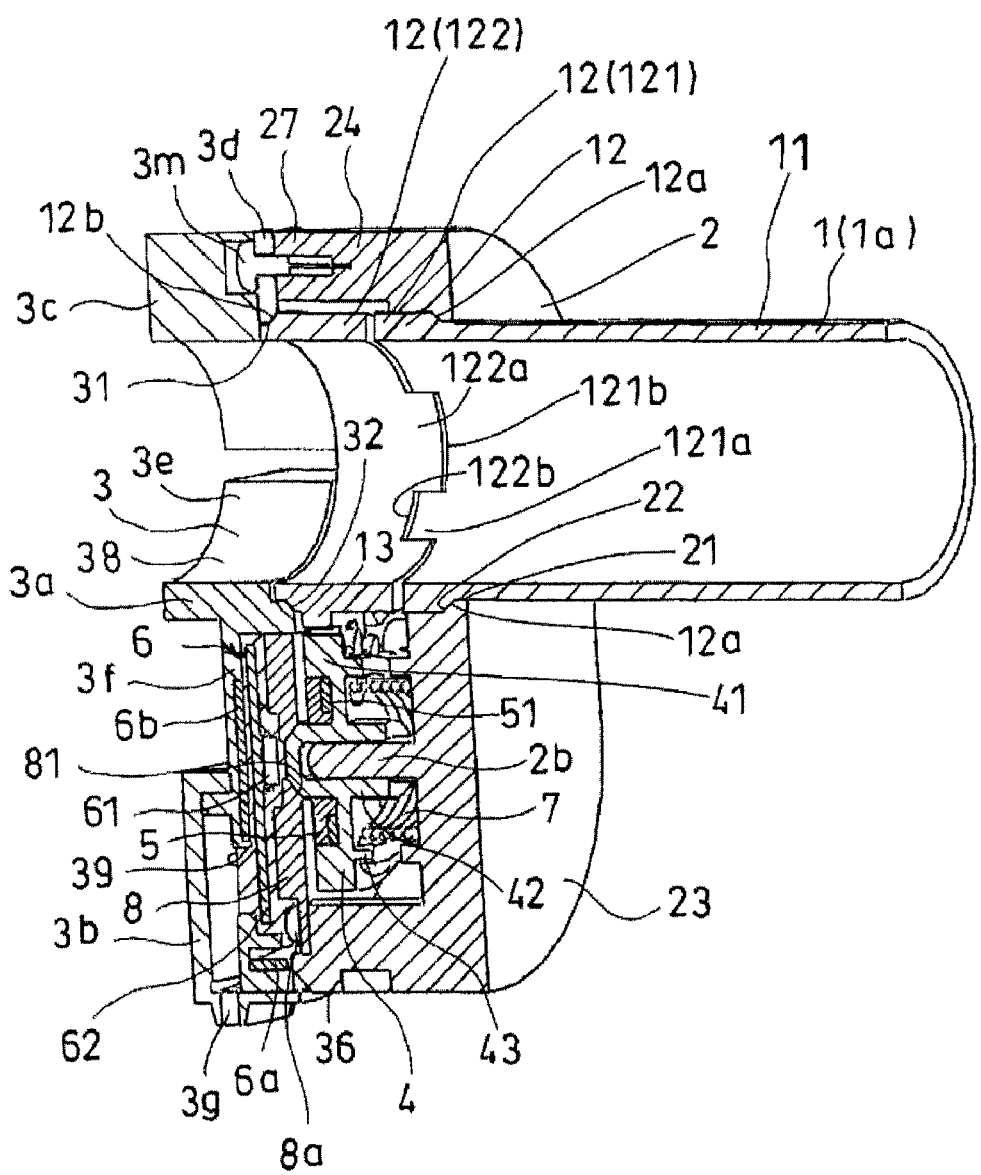
FIG. 6 is a sectional view illustrating an accelerator device according to the third embodiment of the present disclosure.

FIG. 6 is a sectional view illustrating an accelerator device according to the third embodiment of the present disclosure.

In the accelerator device of the third embodiment, the large-diameter portion 12 of the grip cylinder member 1a of the accelerator device of the first embodiment is divided in the axial direction. A plurality of rectangular driven-side convex portions 122a and driven-side concave portions 122b are alternately arranged on the circumference at an end part of a driven-side grip portion 122. A plurality of rectangular operating-side convex portions 121a and operating-side concave portions 121b are alternately arranged on the circumference at an operating-side grip portion 121. Then, interspace is axially formed as clearance at least between distal ends of the driven-side convex portions 122a and bottoms of the operating-side concave portions 121b and between bottoms of the driven-side concave portions 122b and distal ends of the operating-side convex portions 121a.

That is, interspace along the axial direction allowing axial movement of the operating-side grip portion 121 against the driven-side grip portion 122 is disposed to engaging portions at which the driven-side convex portions 122a and the driven-side concave portions 122b being an engaging portion of the driven-side grip portion 122 and the operating-side convex portions 121a and the operating-side concave portions 121b being an engaging portion of the operating-side grip portion 121 are mutually engaged. Accordingly, engagement is performed as allowing axial movement of the operating-side grip portion 121 against the driven-side grip portion 122.

The structure of the third embodiment other than the above is approximately the same as the first embodiment. Here, the same numerals are given to similar structural elements and the description thereof will not be repeated.

Although a few embodiments have been shown and described, it would be appreciated by those skilled in the art that changes may be made in these embodiments without departing from the principles and spirit of the disclosure, the scope of which is defined in the claims and their equivalents.

What is claimed is:

1. An accelerator device which outputs a signal based on a rotation angle of a repeatedly-rotatable grip, comprising:
    a case arranged to surround a base end part of the grip;
    a grip cylinder member forming a center portion of the grip, the grip cylinder member including a grip cylinder member sector gear;
    a rotary body which rotates with rotation of the grip, the rotary body including a rotary body sector gear, the grip cylinder member sector gear being configured to transmit rotation of the grip to the rotary body through engagement with the rotary body sector gear, the rotary body being approximately disc-shaped and including a cylindrical shaft portion covered at the center part thereof;
    a shaft portion to rotatably support the rotary body formed at a side face of the case, the shaft portion being inserted into the cylindrical shaft portion so that the rotary portion is rotatable about the shaft portion;
    a magnet which rotates with rotation of the rotary body;
    a rotation angle detector which detects a rotation angle of the grip based on magnetic field variation due to rotation of the magnet;
    a separation member which separates the rotary body having the magnet and the rotation angle detector as being disposed therebetween, the separation member including bearing means which rotatably holds the rotary body; and
    an urging member which returns the grip to an original point position by urging the rotary body, the rotary body being pressed toward the separation member side by the urging member;

wherein the magnet is disposed to one side face of the rotary body and the urging member is disposed to an other side face of the rotary body.

2. The accelerator device according to claim 1, wherein the urging member and the magnet are placed coaxially.

3. The accelerator device according to claim 1, wherein the rotation angle detector is held by the separation member; and
   the rotation angle detector, the rotary body and the magnet are placed coaxially.

4. The accelerator device according to claim 1, wherein the urging member and the magnet are placed coaxially;
   the grip includes an operating-side grip portion and a driven-side grip portion divided in the axial direction;
   the operating-side grip portion and the driven-side grip portion each include an engaging portion which transmits rotary motion as being mutually engaged; and
   the engaging portions are mutually engaged so that axial movement of the operating-side grip portion against the driven-side grip portion is allowed.

* * * * *